(12) United States Patent
Apsey

(10) Patent No.: US 7,241,095 B2
(45) Date of Patent: Jul. 10, 2007

(54) DOWEL WITH LOCKING FEATURES AND METHOD OF USING THE SAME

(75) Inventor: Michael Apsey, Davis Junction, IL (US)

(73) Assignee: Driv-Lok, Inc., Sycamore, IL (US)

( * ) Notice: Subject to any disclaimer, the term of this patent is extended or adjusted under 35 U.S.C. 154(b) by 0 days.

(21) Appl. No.: 11/101,337

(22) Filed: Apr. 7, 2005

(65) Prior Publication Data
US 2006/0228193 A1    Oct. 12, 2006

(51) Int. Cl.
*F16B 21/00* (2006.01)
(52) U.S. Cl. .................. 411/351; 411/508; 411/456; 403/296; 403/297; 403/298; 403/292
(58) Field of Classification Search .......... 403/297, 403/292, 296, 298; 411/351, 479, 520, 521, 411/456, 508, 913
See application file for complete search history.

(56) References Cited

U.S. PATENT DOCUMENTS

| | | | | | |
|---|---|---|---|---|---|
| 825,069 | A | * | 7/1906 | Peirce | 403/14 |
| 1,224,720 | A | * | 5/1917 | Salvo | 411/53 |
| 1,287,678 | A | * | 12/1918 | Hall | 403/292 |
| 1,296,342 | A | * | 3/1919 | Tozzi | 52/585.1 |
| 1,470,858 | A | * | 10/1923 | Maxwell | 70/370 |
| 2,001,144 | A | * | 5/1935 | Krnansky | 403/292 |
| 2,313,307 | A | * | 3/1943 | Wilkinson | 210/323.1 |
| 2,525,703 | A | * | 10/1950 | McGirr | 102/317 |
| 2,648,247 | A | * | 8/1953 | Schmuziger | 411/479 |
| 2,874,388 | A | * | 2/1959 | Edelen, Sr. | 5/303 |
| 3,352,191 | A | * | 11/1967 | Crawford | 411/456 |
| 3,430,403 | A | * | 3/1969 | Muse | 52/437 |
| 3,442,170 | A | * | 5/1969 | Lang et al. | 411/479 |
| 3,512,034 | A | * | 5/1970 | Jenkins | 313/354 |
| 4,012,913 | A | * | 3/1977 | Scott | 411/479 |
| 4,021,967 | A | * | 5/1977 | Mulder et al. | 49/171 |
| 4,093,389 | A | * | 6/1978 | Wibrow | 403/280 |
| 4,130,369 | A | * | 12/1978 | Wojcik | 403/297 |
| 4,210,057 | A | | 7/1980 | Goring et al. | |
| 4,284,379 | A | * | 8/1981 | Chaiko | 411/61 |
| 4,389,809 | A | * | 6/1983 | Fischer | 446/122 |
| 4,474,493 | A | * | 10/1984 | Welch | 403/408.1 |

(Continued)

OTHER PUBLICATIONS

DRIV-LOK, Inc., Catalog DLPG-6, A Complete Line of Press Fit Fasteners, "Split Hollow Dowels" and "Plain Pins and Dowels" p. 14, 2002 DRIV-LOK, Inc.

*Primary Examiner*—Robert J. Sandy
*Assistant Examiner*—Jeffrey A. Sharp
(74) *Attorney, Agent, or Firm*—Marshall, Gerstein & Borun LLP

(57) ABSTRACT

A hollow dowel pin adapted to secure together at least two mating components during the assembly thereof includes an elongate generally cylindrical main body portion, first and second mating edges, and at least one outwardly extending tab. The elongate generally cylindrical main body portion is preferably formed from a sheet member, and the first and second mating edges are disposed along a length of the body portion being spaced from one another. The at least one outwardly extending tab is formed along the main body portion and is adapted to engage one of the mating components when an end of the main body portion is frictionally held in an opening formed in the other of the mating components.

15 Claims, 4 Drawing Sheets

U.S. PATENT DOCUMENTS

| | | | |
|---|---|---|---|
| 4,481,702 A * | 11/1984 | Mitchell | 29/432 |
| 4,596,503 A | 6/1986 | Mirsberger et al. | |
| 4,611,963 A | 9/1986 | Frohlich et al. | |
| 4,893,973 A | 1/1990 | Herb | |
| 4,963,051 A | 10/1990 | Hutter | |
| 5,022,777 A * | 6/1991 | Kolvites | 403/14 |
| 5,088,180 A * | 2/1992 | Nottingham et al. | 29/525 |
| 5,088,851 A | 2/1992 | Hutter | |
| 5,169,269 A * | 12/1992 | Tatematsu et al. | 411/24 |
| 5,174,676 A * | 12/1992 | Welsch et al. | 403/14 |
| 5,246,322 A | 9/1993 | Salice | |
| 5,288,162 A | 2/1994 | Bisping et al. | |
| 5,367,851 A * | 11/1994 | Larson | 52/585.1 |
| 5,660,492 A * | 8/1997 | Bathon | 403/267 |
| 5,746,557 A | 5/1998 | Kaibach | |
| D406,226 S * | 3/1999 | Larson | D8/354 |
| 5,911,550 A | 6/1999 | Popp et al. | |
| 5,954,447 A * | 9/1999 | Bathon | 403/267 |
| 5,988,964 A | 11/1999 | Lins et al. | |
| 6,132,152 A | 10/2000 | Kaibach et al. | |
| 6,135,688 A | 10/2000 | Belz et al. | |
| 6,238,128 B1 | 5/2001 | Kaibach et al. | |
| D484,781 S | 1/2004 | Miller | |
| 6,742,976 B2 | 6/2004 | Groll | |
| 6,991,397 B2 * | 1/2006 | Welch | 403/297 |
| 2005/0042024 A1 * | 2/2005 | Patrignani | 403/297 |

* cited by examiner

DOWEL WITH LOCKING FEATURES AND METHOD OF USING THE SAME

BACKGROUND

1. Field of the Disclosure

The disclosure generally relates to dowels and, more particularly, to hollow dowels having a locking feature.

2. Brief Description of Related Technology

Dowels and dowel-like devices are widely used and have been around for many years. Such dowels and dowel-like devices include ribbed dowels, dowel fastening devices, expansion dowels, and other various forms of dowel pins.

For example, U.S. Pat. No. 6,742,976 discloses a ribbed dowel. The ribbed dowel is used for winding work pieces and includes a cylindrical body having an outer surface, a first end, a second end, and a plurality of ribs spaced over the outer surface. The dowel further includes a round circular first face on the first end, a round circular second face on the second end, and is constructed from a specific composition.

In another example, U.S. Pat. No. 5,088,851 discloses a dowel fastening device. The dowel fastening device is used for insertion into a board hole having a structural component. The dowel fastening device includes an elongated shape having pivotable triangular-shaped gripping members for insertion into the hole. The gripping members are configured such that the forward edge of each member is faced from the adjacent interior surface of the hole, and such that the device is provided with a pointed component at the end of the shank remote from the support end portion.

In yet another example, U.S. Pat. No. 4,596,503 discloses an expansion dowel assembly with pivotally displaceable tongues. The expansion dowel includes an axially extending sleeve and a spreading component. The tongues are pivotally displaceably connected to the sleeve and are located one after the other along the axial direction of the sleeve. The tongues are split in an axially direction and can be pivoted inwardly and outwardly relative to the sleeve. Lugs are formed on the radially inner surface of the tongues and project axially beyond one end of the tongues.

SUMMARY

One aspect of the disclosure provides a hollow dowel pin adapted to secure together at least two mating components during the assembly thereof. The hollow dowel pin includes an elongate generally cylindrical main body portion formed from a sheet member, and a first and a second mating edge disposed along a length of the body portion with the mating edges being spaced from one another. The hollow dowel pin further includes at least one outwardly extending tab that is formed along the main body portion. The tab is adapted to engage one of the mating components when an end of the main body portion is frictionally held in an opening formed in the other of the mating components.

Another aspect of the disclosure provides a dowel pin for permitting initial alignment and initial fastening together of at least first and second adjacent parts. The dowel pin includes a cylindrically shaped elongate body portion having at least one retention member. The at least one retention member is carried on a first end of the body portion and extends outwardly therefrom. The retention member is operable when a second end of the body portion is frictionally fitted into an opening of a first part. The body portion is hollow and is adapted to ultimately axially receive a fastener to permit the at least first and second parts to be fastened together for final assembly.

Yet another aspect of the disclosure provides a method of retaining a first component relative to a second component during an assembly process that includes inserting a first end of a generally cylindrically shaped elongate body portion into an aperture of the first component; aligning an aperture in the second component with the body portion; engaging the aperture in the second component with a second end of the body portion; temporarily depressing a tab on the body portion; and disposing the second component between the tab and the first component, thereby releasing the tab to allow the second component to be retained between the tab and the first component, and particularly when those two now-joined components are turned over to then permit attachment via the elongate body portion of yet a third component.

Further aspects and advantages may become apparent to those skilled in the art from a review of the following detailed description, taken in conjunction with the appended claims. While the invention is susceptible of embodiments in various forms, described hereinafter are specific embodiments with the understanding that the disclosure is illustrative, and is not intended to limit the invention to the specific embodiments described herein.

DETAILED DESCRIPTION

A dowel, as is disclosed herein, includes a locking feature such as one or more tabs that may retain objects on and by the dowel during an assembly process, for example.

Figure 1:
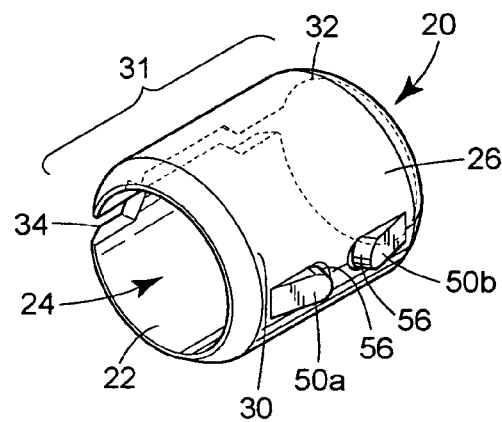
FIG. 1 is an isometric view of one exemplary embodiment of a hollow dowel.
Figure 2:
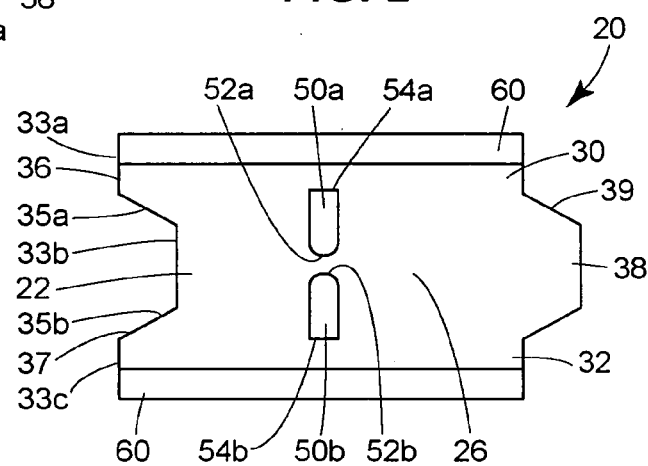
FIG. 2 is plan view of the dowel of FIG. 1 in a pre or unrolled configuration.

Referring to FIGS. 1 and 2, in one exemplary embodiment, a dowel 20 includes an inner surface 22 that defines an aperture or shaft 24, and an outer surface 26. The inner and outer surfaces 22, 26 in combination define a wall that comprises a body 31 of the dowel 20. The body 31 includes a first end 30 and a second end 32 opposite the first end 30.

Figure 3:
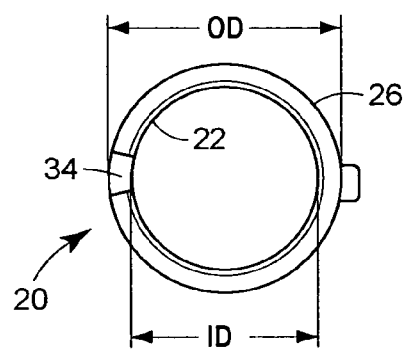
FIG. 3 is a top view of the dowel of FIG. 1.

As illustrated in FIG. 3, the body 31 may have a generally cylindrical shape with an outer diameter ("OD") defined by the outer surface 26 and an inner diameter ("ID") defined by the inner surface 22. The ID and/or OD may be varied by providing a slot or separation opening 34 in the body 31. As illustrated in FIG. 2, the separation opening 34 may be defined by ends of the wall and, more specifically, by a first end 36 and a second end 38. The separation opening 34 may extend from the first end 30 to the second end 32 of the body 31, and may be defined by corresponding and/or parallel surfaces 37 and 39. For example, as illustrated in FIG. 2, the first end 36 is defined by the end surface 37 and the second end 38 is defined by the end surface 39. The surfaces 37 and 39 are substantially parallel to each other from the first end 30 to the second end 32 of the body 31. The surfaces 37, 39 need not be on the same plane however but, as illustrated in FIG. 2, may include one or more undulations or planes, thereby providing a separation opening 34 that is not straight, but rather includes directional changes.

In one exemplary embodiment, the separation opening 34 includes the end surfaces 37 and 39 by which it is defined and a plurality of sharp turns having angles of more than 90° that are connected by straight portions of the separation opening 34. More specifically, the separation opening 34 going from the first end 30 to the second end 32 of the body 31 includes a first straight portion 33a that is generally parallel to a center axis of the body 31. The first straight portion 33a is connected to a first angled portion 35a that is then connected to a second straight portion 33b relative to center axis of the body. Similarly, the second straight portion 33b is then connected to a second angled portion 35b which is then connected to a third straight portion 33c at the second end 32 of the body 31. The body 31 may include the separation opening 34 having undulations or planes, such that upon insertion of the dowel 20 into a part or component, the dowel 20 is limited in its deformation. More specifically, as the surfaces 37, 39 defining the angled portions 35a and 35b abut each other during insertion of the dowel 20, the movement of the first and second ends 36, 38 are limited relative to each other, thereby limited the deformation of the dowel 20.

One or more tabs 50 and, in this exemplary embodiment, the first and second tabs 50a and 50b, are disposed on the body 31, and extend radially outwardly there from. Each of the tabs 50 include a free end 52 and a pivot end 54, wherein the pivot end 54 is fixedly, bendably, and/or pivotally attached to the body 31 and the free end 52 moves relative thereto. The free end 52 may also include a surface 56 (FIG. 1) oriented generally perpendicular to the wall or body 31, such that during operation the surface 56 abuts a second component 58 to be retained. The tabs 50 may be broached, punched or otherwise formed from the wall of the body 31, but may be added as wholly separate pieces.

As illustrated in FIG. 2, the tabs 50a and 50b may disposed in-line with each other from the first to the second ends 30, 32 of the body 31, i.e. axially of the body 31, and may be oriented opposite the separation opening 34 on the body 31. More specifically, the first tab 50b may be disposed near the first end 30 of the body 31, with the pivot end 54a disposed toward the first end 30 and the free end 52a disposed toward the second end 32 of the body 31. Similarly, the second tab 50b may be disposed near the second end 32 of the body 31, with the pivot end 54b disposed toward the second end 32 and the free end 52b disposed toward the first end 30 of the body 31.

The dowel 20 may be constructed from a steel or aluminum material and, in this exemplary embodiment, may be constructed from 1074 steel that is heat treated and phosphate coated. The dowel 20 may, however, be constructed from a variety of materials, including plastics, composites, other metals, and/or a combination thereof.

Figure 4:
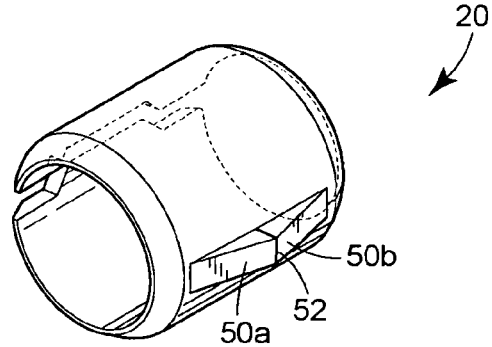
FIG. 4 is an isometric view of another exemplary embodiment of a hollow dowel.

The above exemplary embodiments may be varied to achieve and/or create additional or alternative features. For example, the dowel 20 need not be hollow and need not have a generally cylindrical shape. As such, the dowel 20 may be square, triangular, oval, or odd shaped. The shape of the separation opening 34 may also be varied to achieve alternated shapes and sizes, or may be shortened such that the separation opening 34 does not extend from the first end 30 to the second 32 of the body 31. Alternatively, the separation opening 34 may be removed altogether. The body 31 may also include one or more chamfers 60 and, more specifically, may include chamfers 60 disposed at the first and second ends 30, 32 of the body 31. The one or more tabs 50 may also be altered or varied. For example, as illustrated in FIG. 4, the tabs 50a and 50b may be disposed in the single slot, and may include end surfaces 52 that are substantially facing each other. More specifically, the tabs 50a and 50b may be constructed such that no portion of the body 31 remains between the end surfaces 52 of the tabs 50a and 50b.

The dowel 20 is also not limited to having two tabs 50, but may include one or more tabs 50. As a result, even though the dowel 20 is operable with only one tab 50, two tabs 50 are preferred, such that either end 30 or 32 of the body 31 may be inserted into the first component 58. This is especially helpful when such insertion is handled by automated equipment since, if only one tab 50 were present instead of two, a preliminary operation would be required to properly orient the tab 50 of the dowel 20 prior to insertion into the first component 58.

The dowel 20 may be constructed in various ways, one of which will be described herein. As a result, the below specified construction is only one exemplary embodiment of the dowel 20 being constructed. The dowel 20 may be manufactured from a flat piece of steel or aluminum stock (FIG. 2). The flat piece of stock, prior to being cut into final shape, may undergo an edging process wherein the chamfers 60 are created. The edging process may include an edge roller, and/or may include squeezing the material to obtain the chamfers 60. The tabs 50 may be created in the body 31 or the flat stock by creating a slot, slit, or gap outlining or defining the tab 50, such that only the pivot end 54 remains attached, either pivotally, bendably, or otherwise. The slit may extend from a first end to a second end, such that the pivot end 54 is disposed between the ends of the slit. The slot, slit, or gap may be created in the flat stock by a broaching, cutting, or partial punching process, for example, With the tabs 50 in place, the flat stock may be strip cut at a cutting station such that, preferably, the tabs 50 are centered between the first and second ends 36, 38 of the body 31. The flat stock may be a large piece of stock, such that the generally four sided body 31 requires up to four sides out in order to be retracted from the flat stock piece. Alternatively, the piece of stock may have a generally small width relative to its length. As such, the body 31 may only require two sides out to be extended from the stock piece. For example, the ends 30, 32 of the body 31 may correspond to ends of the stock piece. Once the flat stock is properly sized, the curvature or generally cylindrical shape of the dowel 20 may be created by forming a first half of the dowel 20 on a mandrel, followed in a later operation by forming a second half of the dowel 20. Prior to being heat treated, the tabs 50 may be forced outwardly, such that a spring or bias is created in the tabs 50. In doing so, the pivot ends 54 of the tabs 50 may be permanently deformed so that the tabs 50 remain in an outwardly extended position. As mentioned briefly above, once the structural features of the dowel 20 are complete, the dowel 20 may be tumbled to obtain a certain surface finish and/or to remove any burrs or unwanted debris, may be heat-treated, and may be coated.

The following operation may be accomplished in various ways one of which will be described herein. As a result, the below specified operation may include additional or alternate steps, or may be accomplished with some of the steps deleted or combined.

Figure 5:
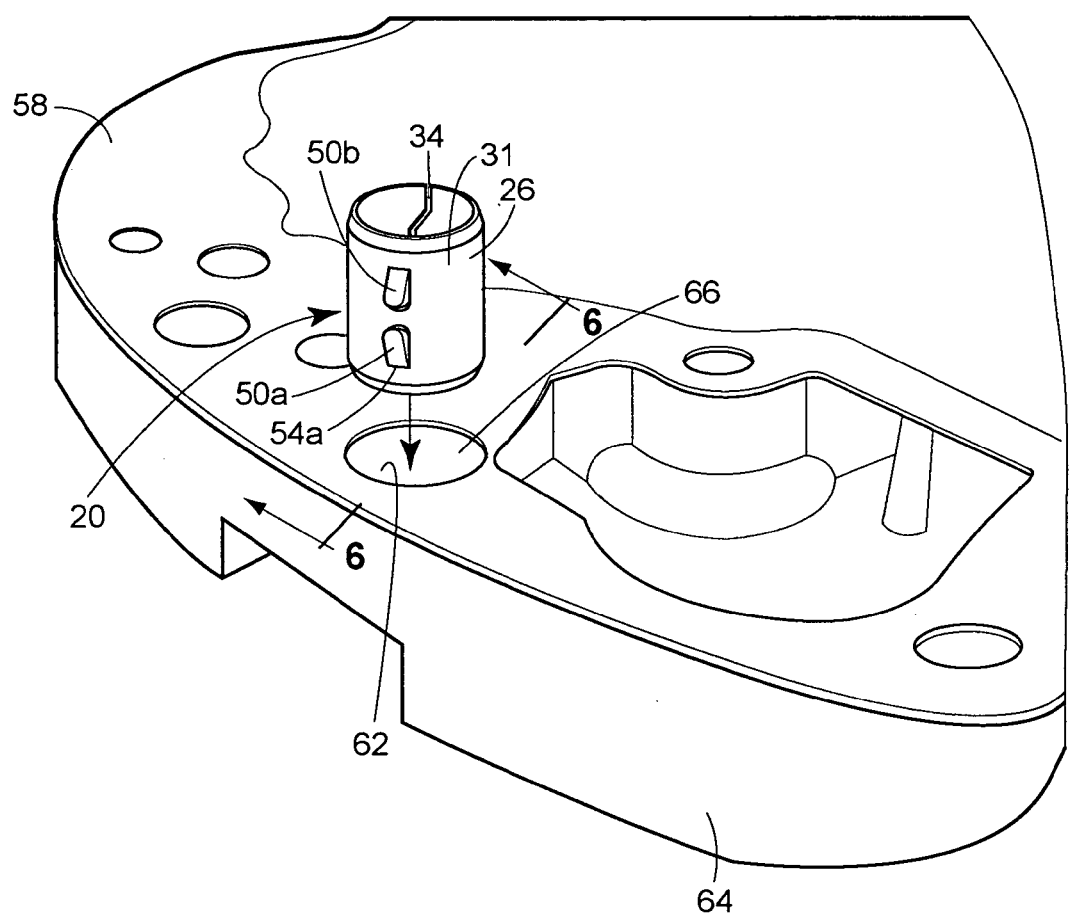
FIG. 5 is an isometric view of the dowel of FIG. 1 aligned with holes in a first and a second component.

As illustrated in FIG. 5, the dowel 20 may be aligned relative to an aperture 62 disposed in a first component 64, such that the center axis of the body 31 is aligned with a center axis of the aperture 62. As seen in FIG. 5, the dowel 20 may additionally be aligned with an aperture 66 disposed in the second component 58, such that the dowel 20 may engage the first and second components 64, 58 during the same operation. Alternatively, as illustrated in FIGS. 6 and 7, the dowel 20 may be aligned with and engage the first component 64 first, with the second component 58 being added later on.

Figure 9:
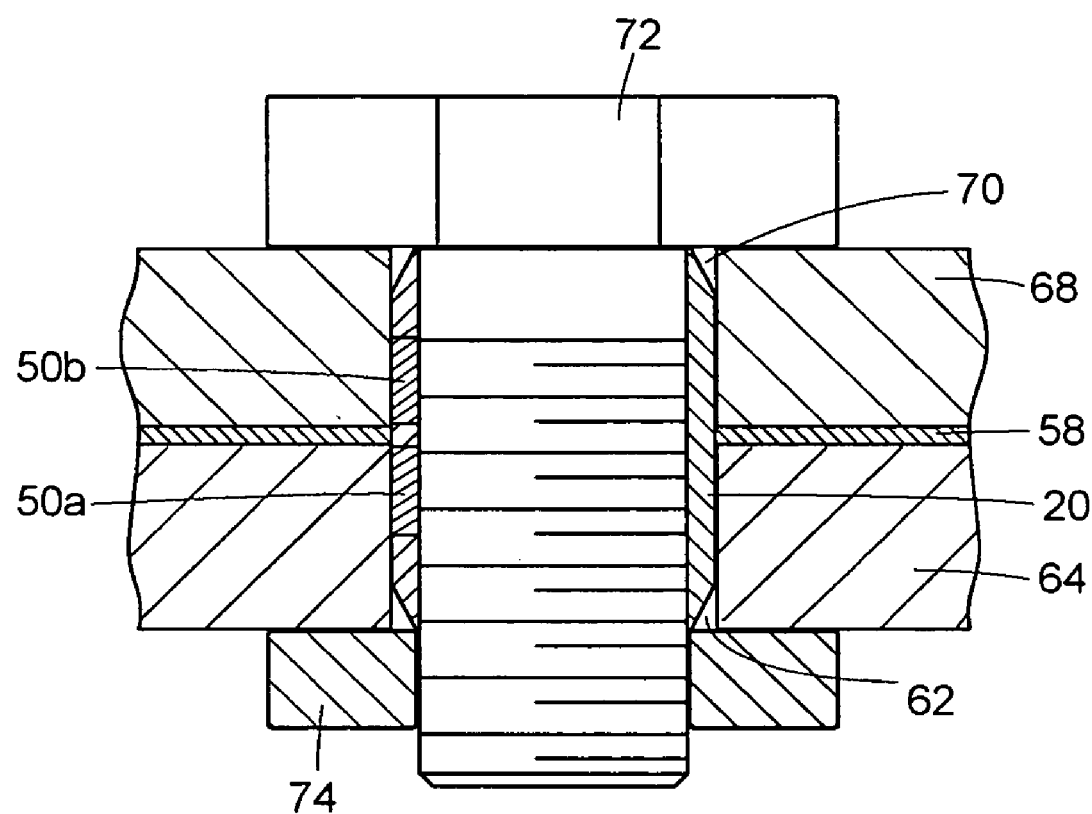
FIG. 9 is a cross-sectional view of FIG. 8 with an added third component and a fastener.

The first component 64, in this exemplary embodiment, is a first portion of a gear housing wherein a third component 68 is a second portion of the gear housing (FIG. 9). The second component 58 is a wear plate that separates the first and second portions of the housing during use. The wear plate, during assembly, needs to be temporarily held in place with the first portion of the gear housing, such that those parts held together when flipped over, for then assembly of that combination of two parts to the third component. However, the components 58, 64, 68 may be one of many objects or parts that can be interconnected, such as a housing, structure, etc.

Figure 6:
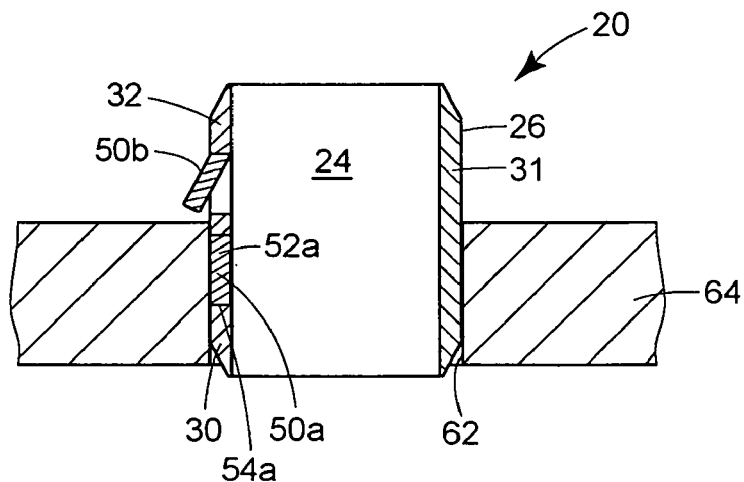
FIG. 6 is cross-sectional view of the dowel of FIG. 1 disposed in the first component without the second component along line 6—6 of FIG. 5.

Once aligned, as illustrated in FIGS. 5 and 6, the dowel 20 may be forced or disposed into the aperture 62 in the first component 64 such that the outer surface 26 of the body 31 engages a surface defining the aperture 62. As the dowel 20 is inserted into the aperture 62 and/or the aperture 66, the pivot end 54a of the tab 50a will contact an edge of the aperture 62 and/or 66, thereby forcing the free end 52a of the tab 50a inwardly toward the hollow shaft 24. In the embodiment wherein the dowel 20 includes the opening 34, the separation opening 34 may be reduced in overall diameter during this portion of the operation depending on the size of the aperture 62 and/or 66. More specifically, to achieve a proper fit between the dowel 20 and the aperture 62, the aperture 62 will preferably have a diameter that is somewhat less than the OD of the dowel 20. As a result, upon insertion of the first end 30 of the dowel 20 with the chamfer 60 into the aperture of the dowel 20, the dowel 20 will be reduced according to the diameter of the aperture 62. Preferably, the distance between the surfaces 37, 39 defining the separation opening 34 is great enough to accommodate the reduction in diameter without abutting the surfaces. The tab 50a, as illustrated in FIG. 6, will be fully recessed into the wall of the body 31 when the first end 30 of the body 31 is fully engaged with the aperture 62.

Figure 7:
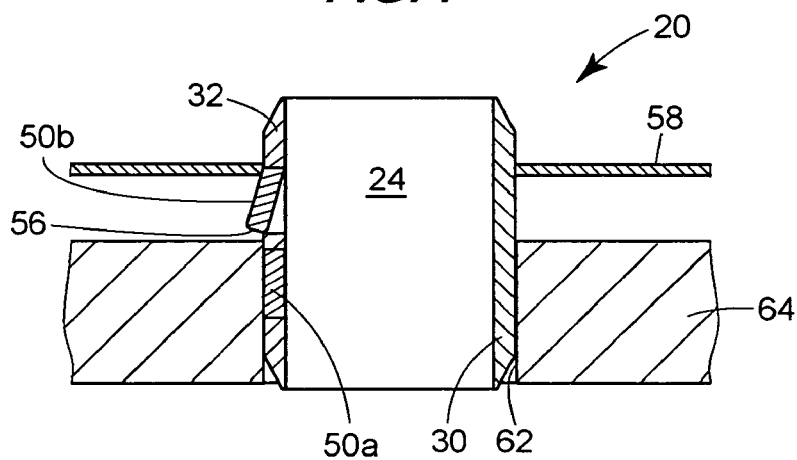
FIG. 7 is a detailed cross-sectional view of FIG. 6 with the second component being added.
Figure 8:
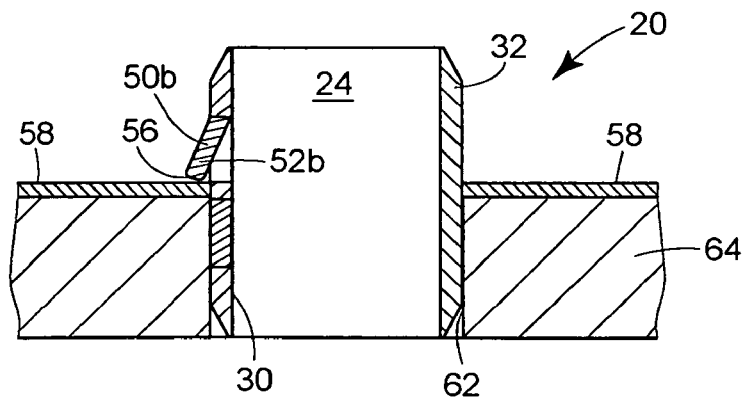
FIG. 8 is a cross-sectional view of FIG. 6 after the second component was added.

The second component 58, and in this exemplary embodiment the wear plate, which eventually will be disposed between the first component 64 and the third component 68, may now be aligned relative to the first component 64 via the dowel 20 (FIGS. 7 and 8). As will be understood to one of ordinary skill in the art, this operation may include one or more dowels 20 depending on the structure, operation, and/or design of the components. Once the aperture 66 of the second component 58 is aligned relative to the dowel 20, the aperture 66 may be placed onto and forced over the second end 32 of the dowel 20. More specifically, a surface defining the aperture 66 may engage the chamfer 60 of the second end 32 and the outer surface 26 of the body 31 until an edge of the aperture 66 abuts the pivot end 54b of the tab 50b. As illustrated in FIG. 7, as the second component 58 passes over the tab 50b, the tab 50b will be temporarily forced or sprung down towards the hollow shaft 24, thereby allowing the second component 58 to pass over the tab 50b. Once the second component 58 has passed the tab 50b, as illustrated in FIG. 8, the spring bias present in the tab 50b will cause the free end 52b of the tab 50b to spring outwardly from the wall of the body 31, thereby causing the second component 58 to be disposed between the free end 52b of the tab 50b and the first component 64.

The first end 30 of the dowel 20 may be inserted into the aperture 62 of the first component 64 at a depth sufficient to provide a proper amount of space between the contact surface 56 of the tab 50b and the first component 64. As a result, once the second component 58 is positioned past the tab 50b, the tab 50b will return to its original radially outwardly extending position, thereby locking the second component 58 between the first component 64 and the contact surface 56 of the tab 50b.

The second component 58 is now secure between the tab 50b and the first component 64 and, as such, the first component 64 may be manipulated without the second component 58 becoming disengaged from or with the dowel 20 and/or the first component 64. For example, the first component 64 may now be lifted, rotated, and/or flipped all the while the second component 58 remaining disposed on the dowel 20. Additionally, no secondary fasteners, such as screws, bolts, clips, and the like, are necessary to retain the second component 58 on the dowel 20 and/or the first component 64.

The third component 68, as seen in FIG. 9, may now be aligned relative to the dowel 20 and, more specifically, an aperture 70 in the third component 68 may be aligned with the dowel 20. Once aligned, the third component 68 may now be forced onto the dowel 20, such that an edge of or surface defining the aperture 70 in the third component 68, engages the tab 50b thereby forcing it inwardly towards the hollow shaft 24 and into the wall of the body 31. The third component 68 may now be fully engaged thereby abutting the third component 68 against the second component 58 and forcing the second component 58 to be abutted against the first component 64. A fastener 72 may now be added through the hollow shaft 24 of the dowel 20, such as a bolt with associated nut for example, thereby retaining the first component 64 and third component 68 together to complete the assembly.

The foregoing description is given for clearness of understanding only, and no unnecessary limitations should be understood therefrom, as modifications within the scope of the invention may be apparent to those having ordinary skill in the art.

What is claimed is:

1. A metal dowel pin for fastening together metal parts, comprising:

a substantially cylindrical metal hollow body portion having a first end and second end, a gap extending through the body portion from the first end to the second end, the first and second ends including a chamfer, the body portion having a hollow and unobstructed core with a substantially constant inner diameter; and first and second generally planar tabs extending outward from an outer surface of the body portion, the first and second tabs being longitudinally aligned;

wherein each tab includes a pivot end fixed to the body portion and a free end unattached to the body portion, each free end including a rounded edge, each free end having a spring bias to an extended position, each free end being flexible to a retracted position, and each rounded edge extending in a longitudinal direction and facing one another.

2. The metal dowel pin of claim 1, wherein the tabs are disposed opposite the gap.

3. The metal dowel pin of claim 1, wherein the body portion is made from 1074 steel.

4. A metal dowel pin for fastening together first and second metal parts, comprising:

first and second metal parts, each of the first and second metal parts having a thickness and at least one throughbore;

a substantially cylindrical metal hollow body portion having a first end and second end, a gap extending through the body portion from the first end to the second end, the first and second ends including a chamfer, the body portion having a hollow and unobstructed core with a substantially constant inner diameter; and first and second generally planar tabs extending outward from an outer surface of the body portion, the first and second tabs being longitudinally aligned;

wherein each tab includes a pivot end fixed to the body portion and a free end unattached to the body portion, each free end including a rounded edge, each free end having a spring bias to an extended position, each free end being flexible to a retracted position, each rounded edge extending in a longitudinal direction and facing one another.

wherein the first and second metal parts are joined and held together by the dowel and the thickness of the first metal part is disposed between the second metal part and the rounded edge of the free end of one of the first and second tabs.

5. A combination dowel and first mating component for securing to a second mating component, comprising:

a first mating component having a thickness;

a dowel comprising a substantially cylindrical metal hollow body portion having a first end and a second end, a gap extending through the body portion from the first end to the second end, the first and second ends including a chamfer, the body portion having a hollow and unobstructed core of a substantially constant inner diameter; and first and second generally planar tabs extending outward from an outer surface of the body portion, the first and second tabs being longitudinally aligned, wherein each tab includes a pivot end fixed to the body portion and a free end unattached to the body portion, each free end including a rounded edge, each free end having a spring bias to an extended position, each free end being flexible to a retracted position, and each rounded edge extending in a longitudinal direction and facing one another, and wherein the thickness of the first mating component is held between the free end of the first tab and the second mating component when the first and second mating components are joined by the dowel.

6. The combination of claim 5, wherein the free ends of the first and second tabs are separated by a distance and the distance is greater than the thickness of the first mating component.

7. The combination of claim 5, wherein the free ends of the first and second tabs are adjacent to one another.

8. The combination of claim 5, wherein regardless of which of the tabs is frictionally held by the second mating component, the free end of the other tab engages and retains the first mating component against the second mating component.

9. The combination of claim 5, wherein the first mating component is a metal mating component.

10. A dowel pin assembly for joining at least first and second parts, comprising:

first and second parts, each having an aperture and a thickness;

a dowel comprising a substantially cylindrical metal hollow body portion having a first end and a second end, a gap extending through the body portion from the first end to the second end, the first and second ends including a chamfer, the body portion having a hollow and unobstructed core of a substantially constant inner diameter, and first and second generally planar tabs extending outward from an outer surface of the body portion, the first and second tabs being longitudinally aligned, wherein each tab includes a pivot end fixed to the body portion and a free end unattached to the body portion, each free end including a rounded edge, each free end having a spring bias to an extended position, each free end being flexible to a retracted position, and each rounded edge extending in a longitudinal direction and facing one another, and wherein the first and second parts are joined and held together by the dowel and the thickness of the first part is disposed between the second part and the free end of one of the tabs.

11. The dowel pin assembly of claim 10, wherein the free end of one tab is held in a retracted position when the dowel is disposed in the aperture of the second part.

12. The dowel pin assembly of claim 11, wherein one of the first and second parts is a metal part.

13. The dowel pin assembly of claim 12, wherein the first part is a metal wear plate and the second part is a portion of a metal gear housing.

14. The dowel pin assembly of claim 10, wherein the gap is non-linear.

15. The dowel pin assembly of claim 14, wherein the gap includes at least two linear portions that meet at an angle.

* * * * *